US007768750B2

(12) United States Patent
Uchida

(10) Patent No.: US 7,768,750 B2
(45) Date of Patent: Aug. 3, 2010

(54) CORDLESS POWER TOOL

(75) Inventor: Hiroki Uchida, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 253 days.

(21) Appl. No.: 12/015,731

(22) Filed: Jan. 17, 2008

(65) Prior Publication Data

US 2008/0315693 A1 Dec. 25, 2008

(51) Int. Cl.
*H02H 7/08* (2006.01)

(52) U.S. Cl. ........................... 361/31; 361/33; 320/134

(58) Field of Classification Search .................. 361/33, 361/31; 320/134
See application file for complete search history.

(56) References Cited

U.S. PATENT DOCUMENTS

| | | | | |
|---|---|---|---|---|
| 7,492,125 | B2 * | 2/2009 | Serdynski et al. | 320/114 |
| 7,553,051 | B2 * | 6/2009 | Brass et al. | 362/373 |
| 2006/0119318 | A1 * | 6/2006 | Serdynski et al. | 320/114 |
| 2006/0222930 | A1 * | 10/2006 | Aradachi et al. | 429/96 |
| 2007/0252435 | A1 * | 11/2007 | Coe et al. | 307/10.1 |

FOREIGN PATENT DOCUMENTS

| | | |
|---|---|---|
| JP | 6-141479 | 5/1994 |
| JP | 2006-243168 | 9/2006 |

* cited by examiner

*Primary Examiner*—Rita Leykin
(74) *Attorney, Agent, or Firm*—McDermott Will & Emery LLP

(57) ABSTRACT

To provide a cordless power tool which can suppress heat generation of a protection unit and prevent the erroneous operation. A cordless power tool 1 includes a body casing 10; a battery 20 which is detachably attached to the body casing 10 and can supply electric power; a motor 30 which is housed in the body casing 10, and generates rotation force by the electric power of the battery 20; a cooling fan 40 which rotates by the rotation force of the motor 30; and a protection unit 50 which shuts off the power supply to the motor 30, in accordance with a detection result of the state of the battery 20, so that the battery 20 does not enter an overdischarge state or an overcurrent state. Herein, a passage of cool air generated by the cooling fan 40 is formed in the body casing 10, and the 16 protection unit 50 is arranged so that at least its part is located in the passage of the cool air.

14 Claims, 6 Drawing Sheets

CORDLESS POWER TOOL

CROSS-REFERENCE TO RELATED APPLICATIONS

This application is based on and claims the benefit of priority from the prior Japanese Patent Application No. 2007-008695, filed on Jan. 18, 2007; the entire contents of which are incorporated herein by reference.

BACKGROUND OF THE INVENTION

1. Technical Field

The present invention relates to a cordless power tool.

2. Background Art

Heretofore, there has been known a cordless power tool (hereinafter referred to as a power tool) which operates upon reception of power supply from a battery pack attached detachably to a main body, such as a jig saw, a stud cutter, or the like. In order to operate such the power tool, large electric power is required. Therefore, in addition to a Ni—Cd battery and a nickel-hydride battery, recently, a lithium-ion battery is widely used as a rechargeable battery of a battery pack.

There is an advantage that the lithium-ion battery can supply large electric power and realize size/weight reduction, while it is necessary to strictly cope with ignition or the life decrease of the battery due to overcharge, overcurrent and overdischarge. For example, regarding the lithium-ion battery, it is thought: in case that the overdischarge occurs or the over current flows in a load, the temperature of the battery increases thereby to lower the life of the battery, or a motor for a power tool is broken; and in case that the overcharge is performed, ignition occurs. For the above problems, there has been known a battery pack having a protection unit (refer to, for example, Patent Document 1) which shuts off supply of electric power to a power tool in case that overcurrent and overdischarge have been detected. In the Patent Document 1, an FET (field effect transistor) is used as the protection unit. Further, such the constitution that the FET as the protection unit is provided not for the battery pack but on the body side of the power tool is also proposed.

[Patent Document 1] Japanese Patent No. 3222951

However, when the power tool is operated with high load, the protection unit may generate heat and causes an erroneous operation due to an influence of the heat. Further, there is fear that the life of the protection unit lowers.

SUMMARY OF THE INVENTION

Therefore, an object of the invention is to provide a cordless power tool which can suppress heat generation of the protection unit and prevent the erroneous operation.

MEANS FOR SOLVING THE PROBLEMS

In order to achieve the above object, the invention provides a cordless power tool comprising: a body casing; a battery which is detachably attached to the body casing and can supply electric power; a motor which is housed in the body casing, and generates rotation force by the electric power of the battery; a cooling fan which rotates by the rotation force of the motor; and a protection unit which shuts off the power supply to the motor, according to a detection result of the state of the battery, so that the battery does not enter an overdischarge state or an overcurrent state. Herein, a passage of cool air generated by the cooling fan is formed in the body casing, and the protection unit is arranged so that at least its part is located in the passage of the cool air.

It is preferable that an air window is formed in the body casing, and the protection unit is provided in the vicinity of the air window. Further, it is preferable that the protection unit is provided in a position where it does not interrupt the passage of the cool air and in a position where its part protrudes in the passage of the cool air, whereby a part of the cool air introduced from the air window goes toward the protection unit and another part of the cool air goes directly to the motor.

Further, it is preferable that the protection unit is located on the upstream side of the motor in a flowing direction of the cool air. Further, it is preferable that: the body casing includes a motor housing in which the motor is housed, and a handle; the motor housing and the handle are coupled to each other at an end portion on the side where the battery is attached and detached, and space is defined between the motor housing and the handle; and the protection unit is arranged in the motor housing.

According to the cordless power tool in the first aspect of the invention, the protection unit is arranged so that at least its part is located in the passage of the cool air. Therefore, it is possible to suppress heat generation of the protection unit and prevent erroneous operation. Further, it is possible to prevent the life of the protection unit from lowering.

According to the cordless power tool in the second aspect of the invention, the air window is formed in the body housing, and the protection unit is provided in the vicinity of the air window. Therefore, also in the motor stopping time, the protection unit is easy to come into contact with the outside air, so that the protection unit is difficult to receive an influence of heat generated by the motor.

According to the cordless power tool in the third aspect of the invention, the protection unit is provided in the position where it does not interrupt the passage of the cool air and in the position where its part protrudes in the passage of the cool air, whereby a part of the cool air introduced from the air window goes toward the protection unit and another part of the cool air goes directly to the motor. Accordingly, without interrupting the cool air flowing toward the motor, the protection unit can be cooled while keeping cooling performance of the motor.

According to the cordless power tool in the fourth aspect of the invention, the protection unit is located on the upstream side of the motor in the flowing direction of the cool air. Accordingly, since the cool air passes through the protection unit and goes toward the motor, the protection unit is difficult to receive the influence of heat generated by the motor.

According to the cordless power tool in the fifth aspect of the invention, the protection unit is arranged in the motor housing. Therefore, design of the handle is not restricted by the protection unit, and it is not necessary to make the handle needlessly thick.

DETAIL DESCRIPTION OF THE INVENTION

Figure 1:
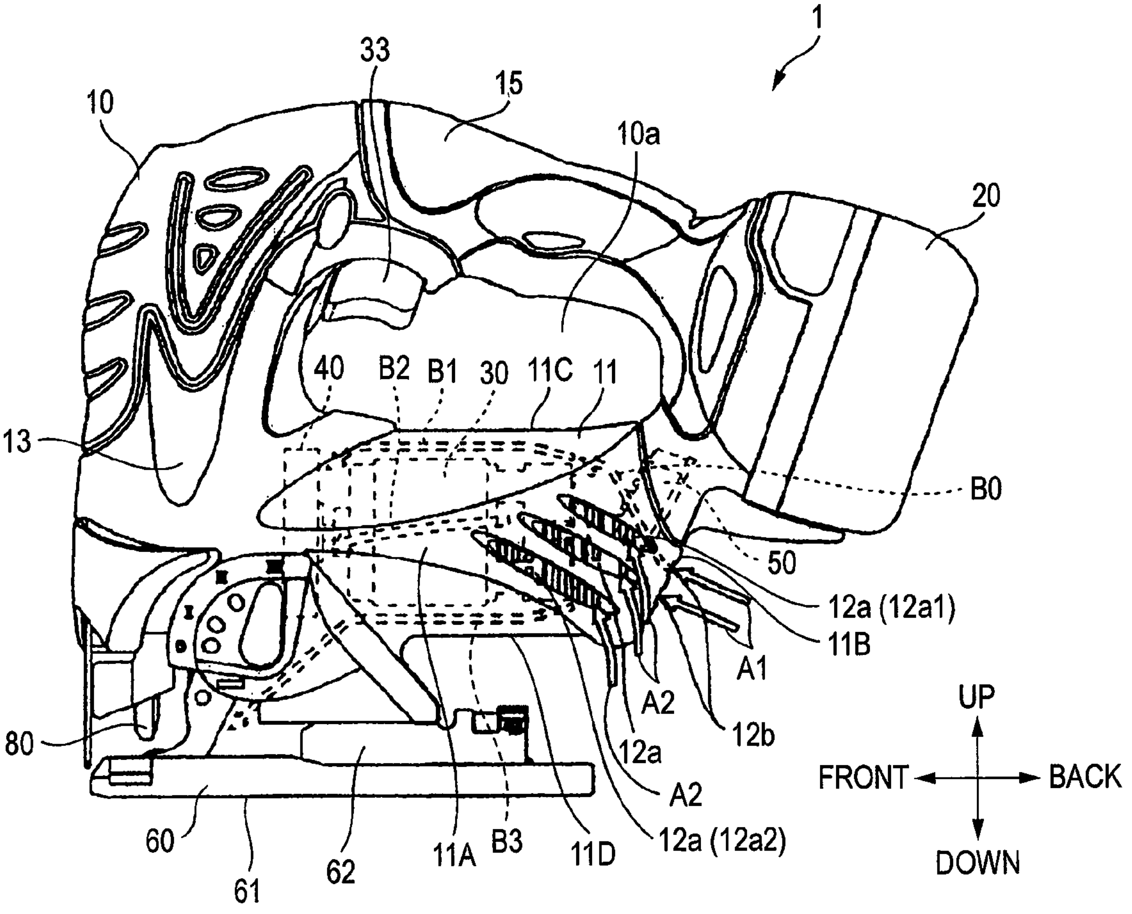
FIG. 1 is a side view showing a cordless power tool according to a first embodiment of the invention.
Figure 2:
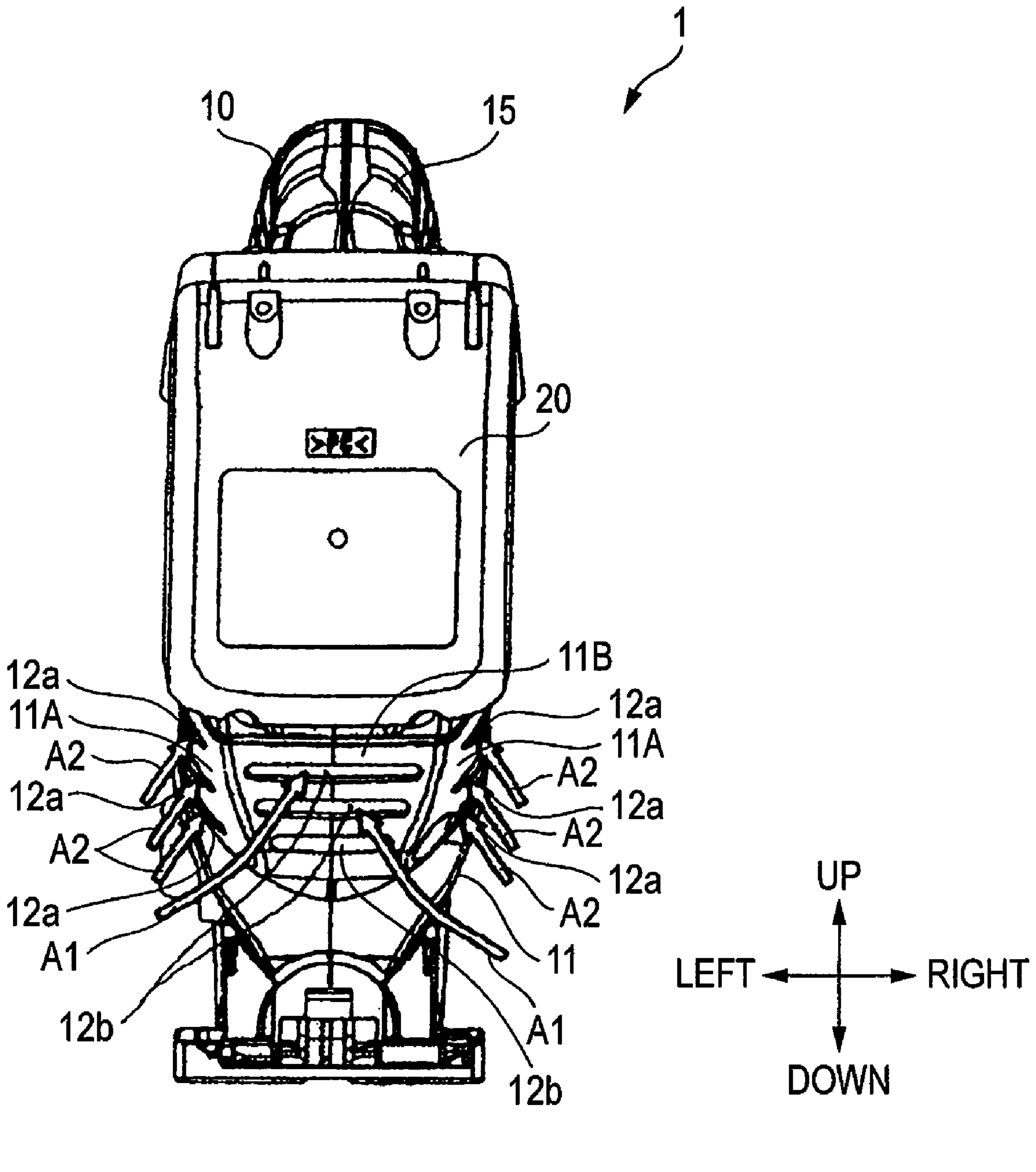
FIG. 2 is a back view showing the cordless power tool according to the first embodiment of the invention.
Figure 3:
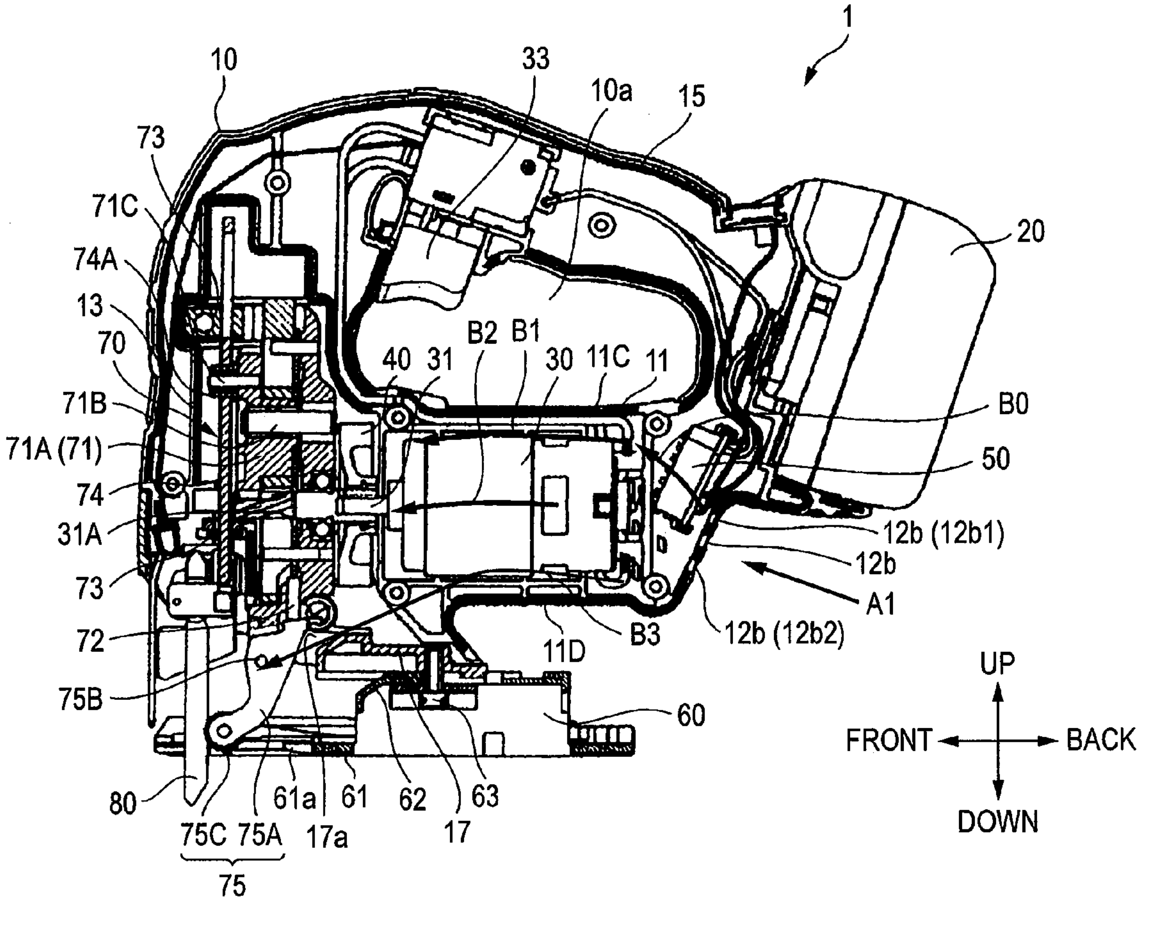
FIG. 3 is a sectional view showing the inner structure of the cordless power tool according to the first embodiment of the invention.

A cordless power tool according to a first embodiment of the invention will be described with reference to FIGS. 1 to 4. A cordless power tool 1 according to the embodiment is a jigsaw. The cordless power tool 1 includes mainly a body casing 10, a battery pack 20, a motor 30, a cooling fan 40, a protection unit 50, a base part 60, a drive part 70 (FIG. 3), and a blade 80. For convenience of description, as shown in FIGS. 1 to 3, a direction of a rotation shaft of the motor 30 is taken as a front and back direction, and a direction which is orthogonal to the front and back direction and where the blade 80 extends is taken as a up-down direction. Further, a direction which is orthogonal to both of the front and back direction and the up-down direction is taken as a left and right direction (FIG. 2).

As shown in FIGS. 1 and 3, the body casing 10 is composed of a frame formed of aluminum, and includes a motor housing 11, a gear housing 13 and a handle 15. In the motor housing 11, a motor accommodating part which is a space in which the motor 30 and the cooling fan 40 are accommodated is demarcated. In the gear housing 13, a gear accommodating part which is a space in which the drive part 70 is accommodated is demarcated. The handle 15 is a grip part for operator's gripping the cordless power tool 1. Further, the body casing 10 includes a bottom wall 17 which is a wall part which separates the motor accommodating part and the gear accommodating part from the outside air.

The motor housing 11 and the handle 15 are coupled to each other at a back end portion (that is, an end portion on the side where the battery pack 20 is attached or detached). Further, between the motor housing 11 and the handle 15, a space 10*a* is defined, by which the operator becomes easy to grip the handle 15.

The motor housing 11 has side walls 11A which are located respectively on the right and the left of the motor 30, a back wall 11B which is located at a back portion of the motor 30, an upper wall 11C which is located at a upper portion of the motor 30, and a lower wall 11D which is located at a lower portion of the motor 30.

In each side wall 11A, plural side air windows 12*a* (three side air windows in this embodiment) of which each is composed of a slit-shaped (or ellipse-shaped) opening portion are formed. Each side air window 12*a* extends in a direction oblique to a horizontal direction (front and back direction), and sizes of the three side air windows 12*a* are different from one another. Further, in the back wall 11B, plural slit-shaped back air windows 12*b* (three back air windows in this embodiment) which extend in the left and right direction are formed. The shapes of the side air window 12*a* and the back air window 12*b* are designed in consideration of flow of cool air and the shape of the motor housing 11.

Between the motor 30 and each side wall 11A, a gap is formed, through which cool air described later can pass. Similarly, between the motor 30 and the upper wall 11C, and between the motor 30 and the lower wall 11D, gaps are formed, through which the cool air can pass. Namely, around the motor 30, the gaps for letting the cool air pass throughout the substantially entire periphery of the motor 30 are secured. Further, between the bottom wall 17 and the drive part 70, an exhaust hole 17*a* for exhausting the cool air to the outside is formed. As described above, in the body casing 10, a passage for the cool air is formed, in which the cool air flows from the side air window 12*a* and the back air window 12*b* through the surroundings of the motor 30 to the exhaust hole 17*a*.

The battery pack 20 is detachably attached to the back end portion of the body casing 10, that is, to the vicinity of the coupling part between the motor housing 11 and the handle 15. The battery pack 20 is constituted so that it can supply electric power to the motor 30 and the protection unit 50. The electric constitution of the battery pack 20 will be described later.

The motor 30 is, as described above, accommodated in the motor housing 11, and can generate rotation force by the electric power supplied from the battery pack 20. From the front end portion of the motor 30, an output shaft 31 (FIG. 3) is extended. At the leading end portion of the output shaft 31, a pinion gear 31A is provided. The handle 15 is provided with a trigger switch 33 which is a switch for ON/OFF of rotation of the motor 30.

The cooling fan 40 is fixed to the output shaft 31 of the motor 30, and rotates together with the rotation of the output shaft 31. As described later, the cool air is produced by the rotation of the cooling fan 40, thereby to cool the motor 30 and the protection unit 50.

The protection unit 50 is composed of an FET (field effect transistor) in the embodiment. In accordance with a detection result of the state of the battery pack 20, the protection unit 50 is used to shut off the power supply to the motor 30 so that the battery pack 20 does not enter an overdischarge state or an overcurrent state. The electric constitution of the protection unit 50 will be described later.

The protection unit 50 is provided in the vicinity of the side air windows 12*a* and the back air windows 12*b*, and arranged in a position where the protection unit 50 overlaps with an uppermost side air window 12*a*1 (FIG. 1) of the side air windows 12*a*, viewed in the left and right direction. Further, the protection unit 50 is located between the motor 30 and the battery pack 20 in the motor housing 11. Further, the protection unit 50 is located on the upstream side of the motor 30 in the flowing direction of the cool air, and arranged so that its part is located in the passage of the cool air. In the embodiment, as show by an arrow B0, a nearly lower half of the protection unit 50 is located in the passage of the cool air. Further, the protection unit 50 is provided in the position where the protection unit 50 does interrupt the passage of the cool air and in the position where apart of the protection unit 50 protrudes in the passage of the cool air.

The base part 60 is formed of aluminum as a base material, and formed in the nearly rectangular shape, viewed from the downside. The base part 60 includes a base plate 61 and a connection part 62. The base plate 61 is a portion which comes into contact with a workpiece in an opposite relation in the using time. In an edge portion on the front side of the base plate 61, a notch is formed to form an opening portion 61*a*. In the using time, the blade 80 can move up and down through the opening portion 61*a*. The connection part 62 is a portion which becomes depressed on the back side of the opening portion 61*a* and on the upside of the base plate 61, and fixed to the bottom wall 17 by a screw 63.

The drive part 70 includes a gear part 71, a transmission part 72, a plunger 74, and a roller part 75. The gear part 71 includes a spur gear 71A engaging with the pinion gear 31A. The spur gear 71A is supported by a spindle 71B rotatably in relation to the gear housing 13. The spur gear 71A is provided with a pin 71C which protrudes anti-coaxially with and in parallel to the spindle 71B.

The plunger 74 is formed nearly in the rod-shape, and supported slidably by supporting parts 73, 73 so that its longitudinal direction becomes the up-down direction. Further, the plunger 74 is supported so that its lower end portion can swing in the front and back direction with its upper end portion as a fulcrum. At the lower end portion of the plunger 74, the blade 80 is retained. Further, at the portion located between the supporting part 73 on the upper end side of the plunger 74 and the supporting part 73 on the lower end side thereof, a reception part 74A which defines a groove extending in the left and right direction is provided, and the pin 71C is inserted into the groove of the reception part 74A. Regarding the pin 71C, the movement in the left and right direction in the groove of the reception part 74A is permitted, and the movement in the up-down direction therein is regulated. Therefore, the reception part 74A performs only the up-down movement correspondingly to the movement of the pin 71C. Accordingly, the rotation of the pin 71C around the spindle 71B can be converted into the up-down movement of the plunger 74.

The roller part 75 includes a roller holder 75A constituted rotatably around a pin 75B, and a roller 75C which is supported rotatably at the front end of the roller holder 75A and comes into contact with the back portion of the blade 80. Though the detailed description of the roller part 75 is omitted, the rotational force of the motor 30 is converted into the up-down reciprocation of the transmission part 72 to rotate the roller holder 75A, so that the blade 80 can be moved also in the front and back direction.

Figure 4:
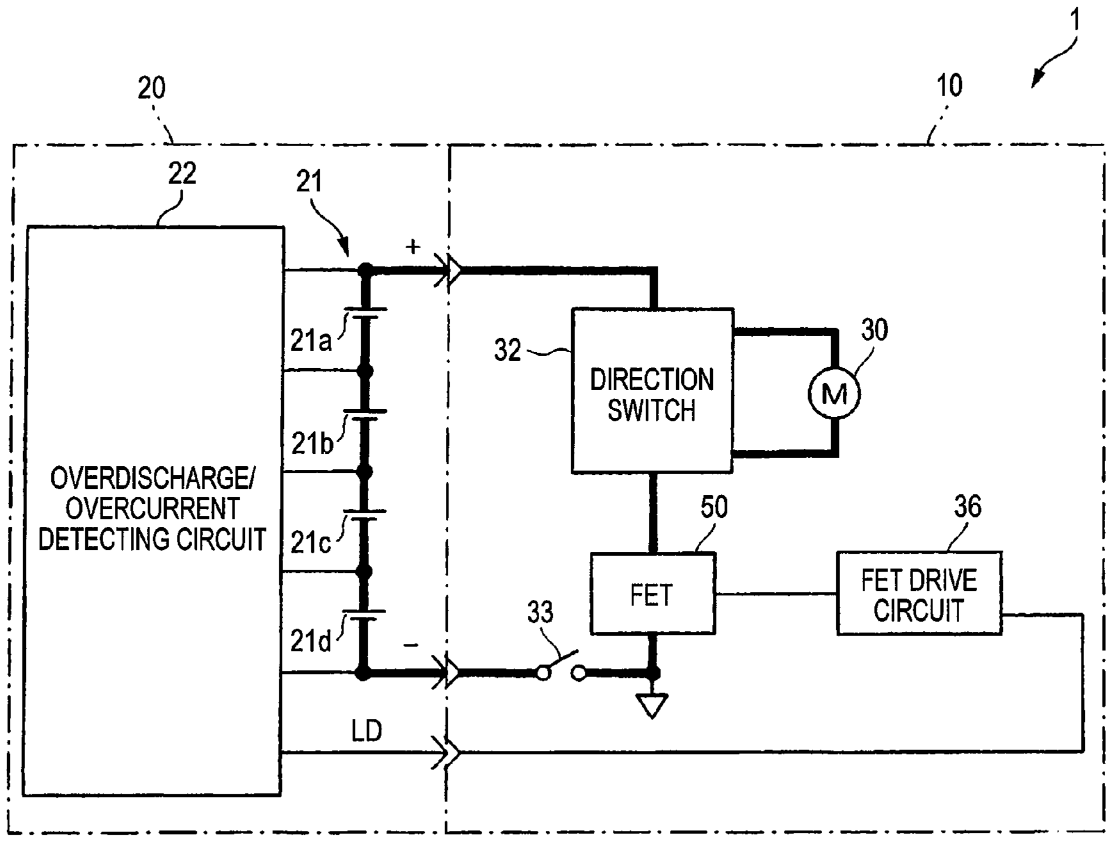
FIG. 4 is a circuit diagram showing the electric constitution of a battery pack and a tool body in the cordless power tool according to the first embodiment of the invention.

Next, an outline of the electric constitution of the cordless power tool 1 will be described with reference to FIG. 4. The battery pack 20 includes a battery group 21 of plural lithium battery cells 21*a* to 21*d*, and an overdischarge/overcurrent detecting circuit 22. The tool body (body casing 10) includes the motor 30, a direction switch 32, a trigger switch 33, the FET 50 (protection unit), and an FET drive circuit 36.

The battery group 21 is used in order to supply the electric power to the tool body (body casing 10) side. The overdischarge/overcurrent detecting circuit 22 is used in order to monitor a state (voltage or current) of the battery group 21 and output, in accordance with its detection result, a predetermined signal relating to the overdischarge state or the overcurrent state from an LD terminal to the tool body (body casing 10) side.

The motor 30 is constituted so as to rotate by the electric power supplied from the battery group 21. The direction switch 32 is a switch for switching a rotational direction of the motor 30. The trigger switch 33 is connected between the motor 30 and the battery group 21. The FET 50 is turned on/off on the basis of a signal from the FET drive circuit 36.

The FET drive circuit 36 is an analog circuit which outputs an ON-signal or an OFF-signal to the FET 50 on the basis of the predetermined signal from the overdischarge/overcurrent detecting circuit 22. Specifically, in case that the predetermined signal is not input from the overdischarge/overcurrent detecting circuit 22, the FET drive circuit 36 outputs the ON-signal to the FET 50 thereby to turn on the FET 50. On the other hand, in case that the predetermined signal is input from the overdischarge/overcurrent detecting circuit 22, the FET drive circuit 36 outputs the OFF-signal to the FET 50 thereby to turn off the FET 50. Thus, in order to prevent the battery pack 20 from entering the overdischarge state or the overcurrent state, the power supply to the motor 30 can be interrupted.

Next, the operation of the cordless power tool 1 according to the first embodiment will be described. As a user pushes on the trigger switch 33, the electric power of the battery pack 20 is supplied to the motor 30, and the motor 30 rotates. At this time, needless to say, the motor 30 generates heat, and the protection unit (FET) 50 also generates heat because the electric current flows in the protection unit 50.

When the motor 30 rotates, the cooling fan 40 also rotates together, whereby outside air is taken in respectively from the side air windows 12*a* and the back air windows 12*b* (refer to arrows A1 and A2 in FIGS. 1 to 3). The taken-in outside air is exhausted through the surroundings of the protection unit 50 and the motor 30 to the outside (refer to arrows B0 to B3).

As described above, in the embodiment, the nearly lower half of the protection unit 50 is located in the passage of cool air. More specifically, of the outside air introduced from the back air windows 12*b*, the cool air (arrows B0 and B1) of the outside air introduced from the back air window 12*b*1 (FIG. 3) located on the uppermost side goes through the surroundings of the nearly lower half of the protection unit 50 toward the motor 30. To the contrary, the cool air (arrows B2 and B3) of the outside air introduced from the back air window 12*b*2 (FIG. 3) located on the lowermost side does not go through the surroundings of the protection unit 50 but goes directly toward the motor 30.

On the other, of the outside air introduced from the side air windows 12*a*, the cool air of the outside air introduced from the side air window 12*a*1 (FIG. 1) located on the uppermost side goes toward the motor 30 so as to graze the side portion of the protection unit 50. To the contrary, the cool air of the outside air introduced from the side air window 12*a*2 (FIG. 1) located on the lowermost side does not go through the surroundings of the protection unit 50 but goes toward the motor 30.

Thus, a part of the cool air of the outside air introduced from the back air windows 12*b* goes through the surroundings of the protection unit 50 to the motor 30, and another part does not go through the surroundings of the protection unit 50 but goes directly to the motor 30. Further, a part of the cool air of the outside air introduced from the side air windows 12*a* goes through the surroundings of the protection unit 50 to the motor 30, and another part does not go through the side portion of the protection unit 50 but goes directly to the motor 30. As described above, though the protection unit 50 is located on the upstream side of the motor 30 in the flowing direction of cool air, it does not interrupt the flow of the cool air. Therefore, by the cool air introduced from both of the side air windows 12*a* and the back air windows 12*b*, the protection unit 50 and the motor 30 can be cooled efficiently.

According to the cordless power tool in the above-mentioned first embodiment, the protection unit 50 is arranged so that at least a part of the protection unit 50 is located in the passage of the cool air. Therefore, it is possible to suppress heat generation of the protection unit 50 and prevent the erroneous operation. Further, it is possible to prevent the life of the protection unit 50 from lowering.

Further, in the body casing 10, the air windows 12*a* and 12*b* are formed, and the protection unit 50 is provided in the vicinity of the air windows 12*a* and 12*b*. Therefore, also when the motor 30 stops, the protection unit 50 is easy to come into contact with the outside air, and difficult to receive an influence of heat generated by the motor 30.

The protection unit 50 is provided in the position where the protection unit 50 does interrupt the passage of the cool air and in the position where a part of the protection unit 50 protrudes in the passage of the cool air. Accordingly, the protection unit 50 is constituted so that a part of the cool air introduced from the air windows 12*a* and 12*b* goes toward the protection unit 50 and another part of the cool air goes directly to the motor 30. Therefore, without interrupting the cool air flowing to the motor 30, the protection unit 50 can be cooled while keeping cooling performance of the motor 30.

Further, the protection unit 50 is located on the upstream side of the motor 30 in the flowing direction of the cool air. Accordingly, since the cool air goes through the protection unit 50 to the motor 30, the protection unit 50 is difficult to receive the influence of heat generated by the motor 30.

Further, the protection unit 50 is arranged in the motor housing 11. Therefore, design of the handle 15 is not restricted by the protection unit 50, and it is not necessary to make the handle 15 needlessly thick.

Figure 5:
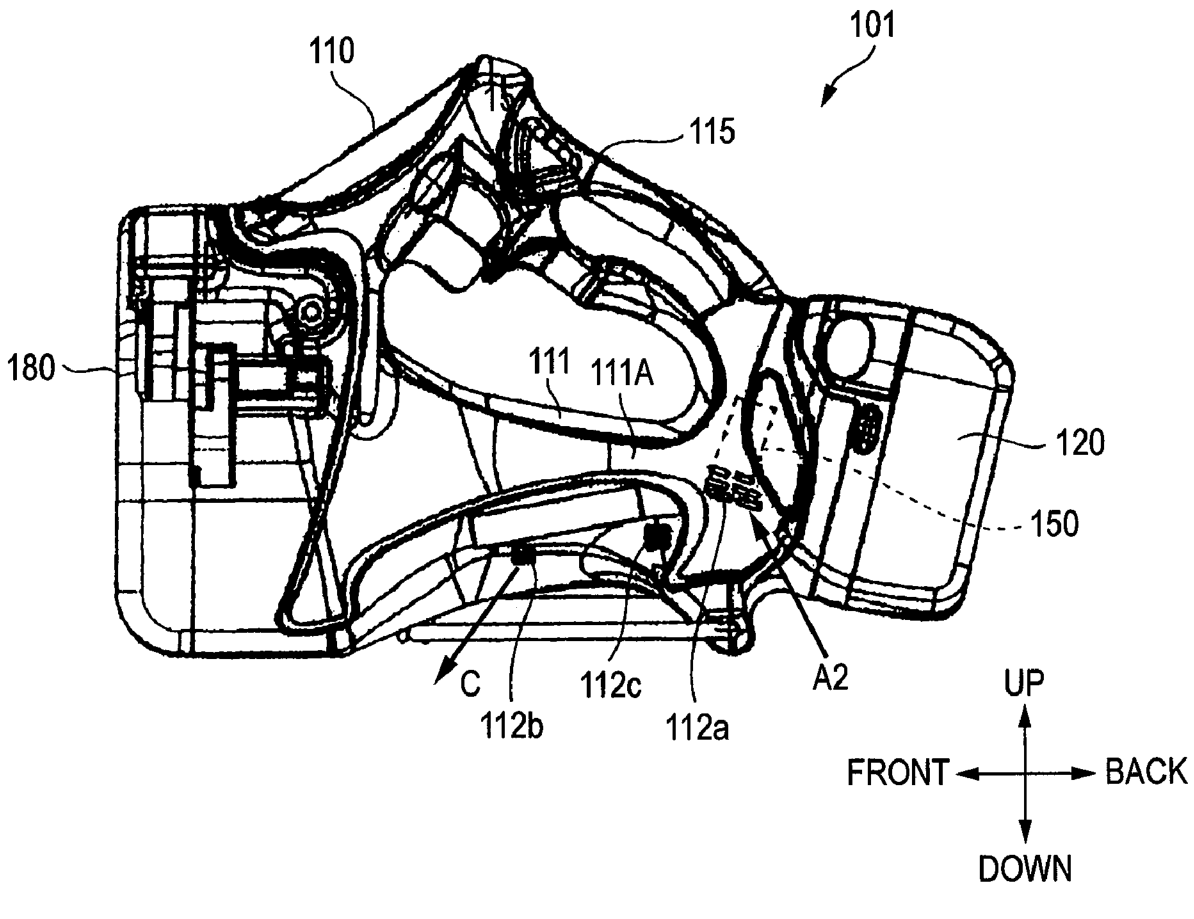
FIG. 5 is a side view showing a cordless power tool according to a second embodiment of the invention.

A cordless power tool according to a second embodiment of the invention will be described with reference to FIG. 5. A cordless power tool 101 according to the embodiment is a stud cutter. The cordless power tool 101 includes a body casing 110, a battery pack 120, a motor and a cooling fan which are not shown, a protection unit 150, and a cutter part 180. In the cordless power tool 101, a full thread is arranged in the cutter part 180 in a predetermined state, and a cutting mechanism provided for the cutter part 180 is operated, whereby the full thread can be cut.

The body casing 110 has a motor housing 111 and a handle 115. Plural air windows 112*a* composed of slit-shaped opening portions are formed at the back portion from the motor (not shown) (in a position close to the battery pack 120), of a side wall 111A of the motor housing 111. Plural exhaust holes 112*b* composed of slit-shaped opening portions are formed in the front portion from the motor (not shown), of the side wall 111A. Further, between the air windows 112*a* and the exhaust holes 112*b*, plural vent holes 112*c* similarly composed of slit-shaped opening portions are formed.

The protection unit (PET) 150 is arranged in the motor housing 111 and between the motor (not shown) and the battery pack 120. Further, the protection unit 150 is provided in the vicinity of the air windows 112*a* (as shown in FIG. 5, in a position where the protection unit 150 overlaps with the air windows 112*a*, viewed in the left and right direction).

According to the cordless power tool 101 in the second embodiment, with rotation of the motor and the cooling fan, the outside air is introduced from the air windows 112*a* (arrow A2). The introduced outside air goes around the motor in the motor housing 111 and is exhausted from the exhaust holes 112*b* to the outside (arrow C). Further, the outside air is introduced a little also from the vent holes 112*c*. Since the outside air introduced from the air windows 112*a* at this time goes along the side surface of the protection unit 150 toward the motor, the protection unit 150 does not interrupt cooling of the motor. Accordingly, both of the protection unit 150 and the motor can be efficiently cooled.

Figure 6:
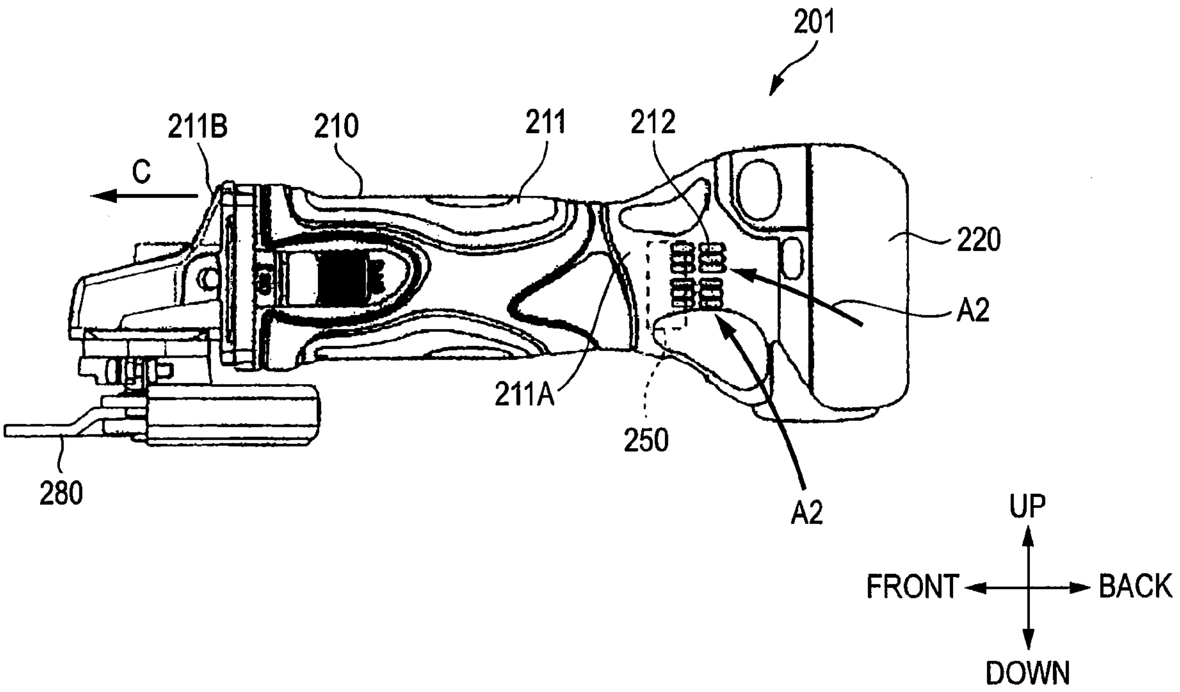
FIG. 6 is a side view showing a cordless power tool according to a third embodiment of the invention.

A cordless power tool according to a third embodiment of the invention will be described with reference to FIG. 6. A codeless power tool 201 according to the embodiment is a grinder. The cordless power tool 201 includes a body casing 210, a battery pack 220, a motor and a cooling fan which are not shown, a protection unit 250, and a grindstone 280. The cordless power tool 201 is a tool for grinding a material to be ground by rotating the grindstone 280 by the drive force of the motor.

The body casing 210 has a motor housing 211. In the cordless power tool 201 according to this embodiment, the motor housing 211 is used also as a handle which is a portion gripped by a user. Plural air windows 212*a* composed of slit-shaped opening portions are formed at the back portion from the motor (not shown) (in a position close to the battery pack 220), of a side wall 211A of the motor housing 211. Plural exhaust holes (not shown) composed of slit-shaped opening portions are formed in a front wall 211B of the motor housing 211.

The protection unit (FET) 250 is arranged in the motor housing 211 and between the motor (not shown) and the battery pack 220. Further, the protection unit 250 is provided in the vicinity of the air windows 212 (as shown in FIG. 6, in a position where the protection unit 250 overlaps with the air windows 212, viewed in the left and right direction).

According to the cordless power tool 201 in the third embodiment, with rotation of the motor and the cooling fan (not shown), the outside air is introduced from the air windows 212 (arrow A2). The introduced outside air goes around the motor in the motor housing 211 and is exhausted from the exhaust holes (not shown) to the outside (arrow C). Since the outside air introduced from the air windows 212 at this time goes along the side surface of the protection unit 250 toward the motor, the protection unit 250 does not interrupt cooling of the motor. Accordingly, both of the protection unit 250 and the motor can be efficiently cooled.

The cordless power tool according to the invention is not limited to the above-mentioned embodiments but various modifications and improvements can be made within the scope as set out in the accompanying claims. For example, in the cordless power tools 1, 101, and 201 according to the above first to third embodiments, the air windows 12*a* and 12*b*, the air windows 112*a*, the air windows 212 are formed respectively thereby to introduce the outside air into the body casing. However, as long as the passage of the cool air is secured, it is not necessary to form the air windows.

Further, though the PET is used as the protection unit in the above-mentioned embodiments, as long as the similar function can be achieved, another transistor may be used.

Further, in the cordless power tool 1 according to the first embodiment, the protection unit 50 is arranged so that a part of the protection unit 50 is located in the passage of the cool air. However, the protection unit 50 may be constituted so that not a part but the whole of the protection unit 50 is located in the passage of the cool air. However, it is preferable that the passage of the cool air flowing to the motor is sufficiently secured even under such the constitution.

What is claimed is:

1. A cordless power tool comprising:

a body casing;

a battery which is detachably attached to the body casing and can supply electric power;

a motor which is housed in the body casing, and generates rotation force by the electric power of the battery;

a cooling fan which rotates by the rotation force of the motor; and a protection unit which shuts off the power supply to the motor, according to a detection result of the state of the battery, so that the battery does not enter an overdischarge state or an overcurrent state, wherein:

a passage of cool air generated by the cooling fan is formed in the body casing, the protection unit is arranged so that at least a part of the protection unit is located in the passage of the cool air, and the protection unit is located on the upstream side of the motor in a flowing direction of the cool air.

2. The cordless power tool according to claim 1, wherein an air window is formed in the body casing, and the protection unit is provided in the vicinity of the air window.

3. The cordless power tool according to claim 2, wherein the protection unit is provided in a position where it does not interrupt the passage of the cool air and in a position where the at least a part of the protection unit protrudes in the passage of the cool air, whereby a part of the cool air introduced from the air window goes toward the protection unit and another part of the cool air goes directly to the motor.

4. The cordless power tool according to claim 1 wherein:

the body casing includes a motor housing in which the motor is housed, and a handle;

the motor housing and the handle are coupled to each other at an end portion on the side where the battery is attached and detached, and space is defined between the motor housing and the handle; and the protection unit is arranged in the motor housing.

5. The cordless power tool according to claim 1, wherein the protection unit includes:

switching means which is disposed between the motor and the battery and is capable of being turned on and off; and control means which turns the switching means off according to the detection result of the detection means.

6. The cordless power tool according to claim 5, wherein the switching means is an FET.

7. The cordless power tool according to claim 1, wherein the battery includes a lithium battery.

8. A protection apparatus for use in a cordless power tool which includes a body casing, a battery which is detachably attached to the body casing and can supply electric power, a motor which is housed in the body casing, and generates rotation force by the electric power of the battery, and a cooling fan which rotates by the rotation force of the motor, said protection apparatus comprising:

a protection unit which shuts off the power supply to the motor, according to a detection result of the state of the battery, so that the battery does not enter an overdischarge state or an overcurrent state, wherein:

a passage of cool air generated by the cooling fan is formed in the body casing, the protection unit is arranged so that at least a part of the protection unit is located in the passage of the cool air, and the protection unit is located on the upstream side of the motor in a flowing direction of the cool air.

9. The protection apparatus according to claim 8, wherein an air window is formed in the body casing, and the protection unit is provided in the vicinity of the air window.

10. The protection apparatus according to claim 9, wherein the protection unit is provided in a position where it does not interrupt the passage of the cool air and in a position where the at least a part of the protection unit protrudes in the passage of the cool air, whereby a part of the cool air introduced from the air window goes toward the protection unit and another part of the cool air goes directly to the motor.

11. The protection apparatus according to claim 8 wherein:

the body casing includes a motor housing in which the motor is housed, and a handle;

the motor housing and the handle are coupled to each other at an end portion on the side where the battery is attached and detached, and space is defined between the motor housing and the handle; and the protection unit is arranged in the motor housing.

12. The protection apparatus according to claim 8, wherein the protection unit includes:

switching means which is disposed between the motor and the battery and is capable of being turned on and off; and control means which turns the switching means off according to the detection result of the detection means.

13. The protection apparatus according to claim 12, wherein the switching means is an FET.

14. The protection apparatus according to claim 8, wherein the battery includes a lithium battery.

* * * * *